United States Patent Office 2,993,825
Patented July 25, 1961

2,993,825
PROCESS FOR PREPARING COATED CELLULOSIC STRUCTURES
Thomas Barton Gage, Richmond, Va., assignor to E. I. du Pont de Nemours and Company, Wilmington, Del., a corporation of Delaware
No Drawing. Filed Nov. 6, 1957, Ser. No. 694,724
13 Claims. (Cl. 154—139)

This invention relates to improvements in the bonding of cellulosic reinforcing structures to elastomers and other materials and particularly to new and useful adhesive coatings for cellulosic structures which are used in the reinforcement of rubber products.

The use of rayon and other synthetic fibers as reinforcing elements in vulcanized rubber structures has presented troublesome problems in suitably bonding these reinforcing elements to the rubber. This is due to the fact that these synthetic fibers do not adhere to rubber adequately without special treatments. The bonding problem has been solved to the extent that satisfactory tires reinforced with artificial fibers have been produced. This has been accomplished by applying an adhesive composition to the cords which are used for the reinforcement of tires.

Fabric reinforced conveyor belts are made by plying together a number of layers of woven fabric and rubber and bonding the rubber to the fabric so that each layer of fabric, as well as the entire belt, is surrounded by rubber bonded to fabric. When a cotton fabric is used, an acceptable belt results from this procedure. However, a belt made with a rayon fabric is unacceptable due to inadequate fabric-to-rubber adhesion.

It has recently been found that a satisfactory level of adhesion can be obtained by employing regenerated cellulose structures which have been coated with an aqueous dispersion containing a water-soluble polymer such as carboxymethyl cellulose, a polyisocyanate adduct having the formula $R(HNCOOC_6H_5)_n$ where R is aromatic or aliphatic and $n$ is at least 2 and preferably containing a rubber latex. Adhesive coated yarns of this type are described and claimed in the copending U.S. application Serial No. 694,749 of James D. Geerdes, filed concurrently herewith. Although these adhesive coated structures give an acceptable level of adhesion, further improvements are desirable particularly for use in conveyor belts used to transport wet materials where a high level of adhesion must be maintained after prolonged exposure to water.

It is, therefore, an object of this invention to provide a new and useful adhesive coated cellulosic structure and a process for its production. Another object is to provide an improved adhesive coating for bonding rubber or other elastomeric materials to regenerated cellulosic structures which have been coated with an aqueous dispersion consisting of a water-soluble organic polymer, a rubber latex, and the reaction product of an aromatic or substituted aromatic polyisocyanate and a phenol. A further object is to provide an adhesive coating for bonding structures which are used for transporting wet materials. Other objects will become apparent from the example and description that follow.

The above objects are accomplished by applying to said coated structures an aqueous dispersion containing a rubber latex, a phenol and an aldehyde which may be partially in the form of an initial condensation product, the aldehyde being present in an amount capable of forming an infusible, insoluble resin. Preferably the aqueous solution also contains an alkaline catalyst.

The after-coated regenerated cellulose structures of this invention may be bonded to rubber, after drying, in the customary manner by the use of heat and pressure to form reinforced articles in which both the dry and wet adhesion of the cellulose to rubber is outstanding as compared to articles prepared from structures which are not after-coated. This improvement is surprising since it would be expected that the adhesion level obtained from the application of two adhesive coatings would be controlled by the weaker of the two adhesive bonds rather than superior to either of the two as is the case with the structures of the present invention.

The aqueous after-coating dispersion is conveniently prepared by mixing together equal volumes of (1) a latex dispersion in water containing a small amount of an alkali, such as sodium hydroxide and (2) an aqueous solution containing the desired amount of the phenol, sufficient aldehyde to react with all the phenol and a small amount of alkali. Obviously, there may be some condensation of the phenol and aldehyde in the solution to form resin; however, for the most part the reaction takes place after the regenerated cellulose structure is coated.

The phenolic compounds and aldehydes which are suitable in the present invention are those which form thermosetting resins. These resins should be capable of condensing, polymerizing, or setting up rapidly and completely to a substantially insoluble, infusible form, with or without the presence of a catalyst or condensing agent, at temperatures of about 250° F. or less. Preferably the phenolic compounds and aldehydes are both water soluble to the extent of 0.5 to 5% by weight.

Among the phenolic compounds possessing the above-mentioned qualifications, and therefore particularly satisfactory for use in the operation of this invention, are the polyphenols, especially the polyphenols having the hydroxyl groups in the benzene nucleus meta with respect to one another, such as resorcinol, phloroglucinol, and orcinol. The preferred concentration of phenolic compound in the solution or dispersion for treating cellulosic structures is between 0.5 and 5% by weight.

Commonly, formaldehyde is the aldehyde used, but any aldehyde satisfying the foregoing qualifications is satisfactory. For example, acetaldehyde or furfural may in some cases be substituted for formaldehyde either wholly or in part. The aldehyde is used preferably in some excess of that theoretically required to react with all of the phenol in order to insure condensation of all of the phenol present.

Usually, it is desirable to add to the aqueous solution of resin-forming materials, containing essentially a phenolic compound and an aldehyde, a small amount of catalyst or condensing agent for the resinification reaction. Catalysts or condensing agents which are basic in nature are preferred. Of these, sodium hydroxide is most commonly employed and may be added in any desired amount according to the special characteristics of the solution in which it is to be used although amounts are preferred between 0.02 and 0.8% by weight. Other suitable catalysts include potassium hydroxide, and other alkaline condensing catalysts which may be used in the amounts just mentioned.

The latex employed in the process of the present invention may be a natural rubber latex or a synthetic latex of the type commonly used in the industry, e.g., latices containing copolymers of butadiene, styrene and vinyl pyridine, and acrylonitrile. The latices employed are commercial formulations which usually contain antioxidants and other minor ingredients. The concentration of latex solids in the after-coating solution is preferably in the range of 8 to 20%.

The adhesive coated structures which are suitable for after-coating in accordance with the present invention are regenerated cellulose yarns, fabrics or other structures which have been treated with an aqueous dispersion containing the reaction product of an aromatic or substituted aromatic polyisocyanate and phenol, an organic water-soluble polymer and a rubber latex. The preferred adhesive structure is one which has been coated with an aqueous dispersion containing 0.04 to 0.5% sodium carboxy methyl cellulose, 0.1 to 2.0% "Gen Tac,"[1] a butadiene/styrene/vinyl pyridine latex, and 0.1 to 2.0% of the phenol adduct of diphenylmethane-4,4'-diisocyanate. Other water-soluble polymers which may be used include a water-soluble salt of alginic acid, such as sodium alginate, gum tragacanth, polyacrylamide, polyvinyl alcohol, a diethylaminoethyl methacrylate polymer, sodium cellulose sulfate, sodium polyacrylate, and sodium pectate. The preferred polymers are salts of acid containing polysaccharides, particularly sodium carboxy-methyl cellulose since this material serves to produce a more stable dispersion and gives generally higher adhesion values than other water-soluble organic polymers. The latex employed may be natural rubber latex or any of the various synthetic latices. Among the polyisocyanates which are suitable for preparing the adducts to be used in these aqueous dispersions are toluene diisocyanate, benzene diisocyanate, naphthalene diisocyanate and triphenylmethane triisocyanate. Additional details regarding preparation and application of these adhesive coatings to regenerated cellulose yarn and other structures will be found in the above-mentioned copending application of James D. Geerdes.

*Example*

Aqueous dispersions of an isocyanate adduct of the formula, $R(HNCOOC_6H_5)_n$, and carboxymethyl cellulose (CMC) were prepared by grinding 20 grams of the dry crystalline adduct and 1.0 gram of commercial grade sodium carboxymethyl cellulose in 1100 grams of sand containing 268 grams of water for 40 minutes according to the process of Hochberg U.S. 2,581,414. A 40% dispersion of "Gen Tac" latex, a butadiene/styrene/vinyl pyridine latex, was then added together with sufficient additional water to give a final concentration of 2.0% adduct, 0.1% CMC and 0.4% latex and the sand filtered out. Dry "Super Cordura"[2] high tenacity rayon yarn of 1650 denier and 1100 filaments was treated on a slashing machine with the aqeuous dispersion prepared as described above. The yarn was passed through the dispersion, contained in the slasher pan at a temperature of 25 to 30° C., for a distance of 30 inches at a speed of 50 y.p.m. The yarn was then passed through the slashing machine in the usual manner where it was stretched 3% and dried, the temperature of the slasher drying rolls being 135° C. No additional finish was applied to the yarn. The yarn was then woven into a 26 oz. per square yard plain weave fabric of the type used in conveyor belt construction. The fabric had 17, 4-ply ends in the warp and 14, 3-ply ends in the filling.

Part of the fabric, prepared as described above, was dipped in a resorcinol-formaldehyde-latex (RFL) dip for 2 minutes, then removed, allowed to drain and dried in an oven for 1 hour at 100° C.

The RFL dip was prepared by adding 2000 ml. of a resin-forming solution, consisting of 1728 ml. of water, 68 g. of resorcinol, 144 ml. of 40% formaldehyde and 60 ml. of 10% sodium hydroxide, to 2000 ml. of latex solution consisting of 1000 ml. of natural rubber latex containing 60% solids, 940 ml. water and 60 ml. of 10% sodium hydroxide.

Three 5 x 10 inch sections of the fabric were sandwiched in alternate layers between 5 x 8 inch sections of unvulcanized rubber sheet. The rubber stock had the following composition:

100 parts smoked sheet
15 parts zinc oxide
15 parts stearic acid
1 part pine tar
1 part "Neozone D"[3] (phenyl-beta-naphthylamine)
1 part 2-mercaptobenzothiazol
2.5 parts sulfur
25 parts "Philblack A"[4] (furnace carbon black)

The sample was then placed in a hot press at a pressure of 200 p.s.i. and heated at 150° C. for 50 minutes. The sample was then removed and allowed to come to room temperature and cut lengthwise into 1-inch strips. The force in pounds required to pull apart adjacent fabric strips in the 1-inch sample was determined on a commercial Instron tester. Wet adhesion tests were made by soaking the fabric test strips in water for 7 days at 25° C. and then measuring the force required to pull the strips apart as described above.

Tests were made on the after-coated fabric and for comparison on samples of fabric which were not after-coated. Also, for comparison, fabric was woven from untreated yarn, dipped in the RFL after-coating solution and tested as described above. Results of these tests are shown below.

|  | Adhesion lbs. | |
| --- | --- | --- |
|  | Dry | Wet |
| Adduct A Dispersion+RFL | 48 | 39 |
| Adduct B Dispersion+RFL | 27 | 28 |
| Average | 38 | 34 |
| Adduct A Dispersion Alone | 32 | 22 |
| Adduct B Dispersion Alone | 23 | 21 |
| Average | 28 | 22 |
| RFL Alone | 28 | 15 |

Adduct A—phenol adduct of diphenylmethane-4,4'-diisocynate.
Adduct B—phenol adduct of toluene diisocyanate.

The foregoing example illustrates the advantage of the process of this invention wherein the bond between certain adhesive coated regenerated cellulose reinforcing materials and rubber is greatly enhanced by after-coating the reinforcing structure with an aqueous dispersion containing a rubber latex and resin-forming ingredients. The after-coating may in some cases be applied to the yarn before weaving or twisting or to fabric or twisted structures such as tire cords or to staple fiber, or paper or nonwoven webs or films. In commercial practice the adhesive coated structures may be prepared in advance, i.e., coated and dried, and stored for short periods of time before being used, without harmful effects.

The after-coated products of this invention are advantageously used in the reinforcing of rubber products such as conveyors, transmission and V belts, automobile and bicycle tires, braided and woven hose, neoprene and vinyl-coated fabrics, etc. A particular advantage of the product of this invention is the high degree of adhesion which can be obtained even after prolonged exposure to water.

While it is preferable to use adhesive coated regenerated cellulose in preparing the products of this invention, natural cellulosic structures such as cotton fibers, yarns, cords and fabrics and cellulose pulp products such as paper and film may be used. Other suitable structures will be apparent to those skilled in the art.

---

[1] Trademark of General Tire and Rubber Company for its rubber latex.
[2] Trademark of E. I. du Pont de Nemours and Company for its high tenacity rayon yarn.
[3] Trademark of E. I. du Pont de Nemours and Company for its rubber anti-oxidant.
[4] Trademark of Phillips Chemical Company for its furnace carbon black.

I claim:

1. The process of preparing coated fibrous cellulosic structures which comprise after-coating a cellulosic structure bearing on its surface a coating containing a water-soluble organic polymer selected from the group consisting of water-soluble salts of acid-containing polysaccharides, polyvinyl alcohol, gum tragacanth, poly(diethylaminoethyl)methacrylate, polyacrylamide, sodium polyacrylate, and sodium alginate, an adduct reaction product of an aromatic polyisocyanate and phenol, said adduct having the formula $R(HNCOOC_6H_5)_n$, wherein R is an aromatic organic radical and $n$ is at least 2, with an aqueous dispersion containing a rubber latex, a phenol and an aldehyde, said phenol and aldehyde being capable of forming a thermosetting resin; and thereafter drying the resulting after-coated structure.

2. The process of claim 1 in which said phenol is a polyphenol having the hydroxyl groups in the meta position with respect to one another.

3. The process of claim 2 in which said phenol is resorcinol.

4. The process of claim 1 in which said aldehyde is formaldehyde.

5. The process of claim 1 in which said rubber latex is a natural rubber latex.

6. The process of claim 1 in which said cellulosic structure is regenerated cellulose.

7. The process of claim 1 in which the cellulosic structure is cotton.

8. The process of claim 1 in which the coated cellulosic structure is woven into a fabric.

9. The process in which the dried coated structure of claim 1 is sandwiched between two layers of a rubber and vulcanized.

10. The process of claim 1 in which the phenol is present in the amount of at least 0.5% by weight based on the total weight of the dispersion.

11. The process of claim 10 in which the phenol is present in the amount of from about 0.5% to 5% by weight based on the total weight of the dispersion.

12. The process of claim 1 in which the rubber latex solids content is from 8% to 20% of said aqueous dispersion.

13. A shaped fibrous cellulosic structure bearing on its surface a coating comprised of a water-soluble organic polymer selected from the group consisting of water-soluble salts of acid-containing polysaccharides, polyvinyl alcohol, gum tragacanth, poly(diethylaminoethyl)methacrylate, polyacrylamide, sodium polyacrylate, and sodium alginate, an adduct reaction product of an aromatic polyisocyanate and phenol, said adduct having the formula $R(HNCOOC_6H_5)_n$, wherein R is an aromatic organic radical and $n$ is at least 2, said coating being after-coated with an adhesive composition comprising an aqueous dispersion containing a rubber latex, a phenol and an aldehyde, said phenol and aldehyde being capable of forming a thermosetting resin.

References Cited in the file of this patent

UNITED STATES PATENTS

| | | |
|---|---|---|
| 2,128,229 | Charch et al. | Aug. 30, 1938 |
| 2,525,655 | D'Ianni | Oct. 10, 1950 |
| 2,826,526 | Meyrick et al. | Mar. 11, 1958 |

OTHER REFERENCES

Bayer: "Polyurethanes," Modern Plastics, June 1947, pages 149–152, 250.